(12) United States Patent
Gopalasetty et al.

(10) Patent No.: US 9,058,349 B2
(45) Date of Patent: Jun. 16, 2015

(54) METHOD AND SYSTEM FOR MAINTAINING DERIVED DATA SETS

(71) Applicant: Aruba Networks, Inc., Sunnyvale, CA (US)

(72) Inventors: Bhanu Gopalasetty, San Ramon, CA (US); Ramsundar Janakiraman, Sunnyvale, CA (US); Ravinder Verma, San Jose, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 375 days.

(21) Appl. No.: 13/692,920

(22) Filed: Dec. 3, 2012

(65) Prior Publication Data

US 2014/0156604 A1   Jun. 5, 2014

(51) Int. Cl.
*G06F 17/30* (2006.01)
*H04L 29/08* (2006.01)

(52) U.S. Cl.
CPC .... *G06F 17/30371* (2013.01); *G06F 17/30309* (2013.01); *H04L 67/141* (2013.01); *Y10S 707/99939* (2013.01); *Y10S 707/99942* (2013.01)

(58) Field of Classification Search
CPC ................. G06F 17/30309; Y10S 707/99939; Y10S 707/99942; H04L 67/141
USPC ........... 707/692, 695, 781, 785; 709/201, 227
See application file for complete search history.

(56) References Cited

U.S. PATENT DOCUMENTS

| | | | | |
|---|---|---|---|---|
| 8,280,822 | B2 * | 10/2012 | McKeown et al. | 705/320 |
| 8,352,296 | B2 * | 1/2013 | Taneja et al. | 705/5 |
| 8,516,569 | B2 * | 8/2013 | Babula et al. | 726/15 |
| 8,635,080 | B2 * | 1/2014 | McKeown et al. | 705/1.1 |
| 8,769,262 | B2 * | 7/2014 | Nagata | 713/155 |
| 8,782,748 | B2 * | 7/2014 | Olszewski et al. | 726/4 |

* cited by examiner

*Primary Examiner* — Cheryl Lewis
(74) *Attorney, Agent, or Firm* — Ying Wang

(57) ABSTRACT

A first data set is derived from a second data set. The first data set is stored in a database of derived data sets. The second data set is updated without updating the first data set, such that the first data set and the second data are inconsistent. The first data set is deleted or updated during batch processing of the database of the derived data sets.

24 Claims, 2 Drawing Sheets

METHOD AND SYSTEM FOR MAINTAINING DERIVED DATA SETS

TECHNICAL FIELD

The present disclosure relates to maintaining derived data sets. In particular, the present disclosure relates to updating or deleting derived data sets stored in a database during batch processing of the database instead of in response to updates to data sets from which the derived data sets were derived.

BACKGROUND

Applications executing on one or more devices may establish a communication session for exchanging data. Session information about the communication session is stored on at least one device executing one of the applications that are exchanging data. Session information may include information associated with the applications, users, devices, etc. involved in the communication session. Session information may include a unique identifier to distinguish the corresponding communication session from other communication sessions.

In an example, a first client device executing a first application stores session information about a communication session. Messages transmitted on behalf of the first application by the first client device include the session information so that receiving devices and/or applications are able to identify the session.

In an example, a first endpoint, such as a first application executing on a first device may attempt to establish a communication session with a second endpoint, such as a second application executing on a second device (or the same first device). In order to establish a communication session, the first endpoint transmits a first packet that identifies a source port as the port which corresponds to the first application and an initial sequence number. The first packet further identifies a destination port as the port which corresponds to the second application. The second application receives the first packet and stores the sequence number of the first packet. Furthermore, the second application transmits a reply packet to the first application with an initial sequence number. The first or second application may store or manage session information about the session and refer to the session information for future communication.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
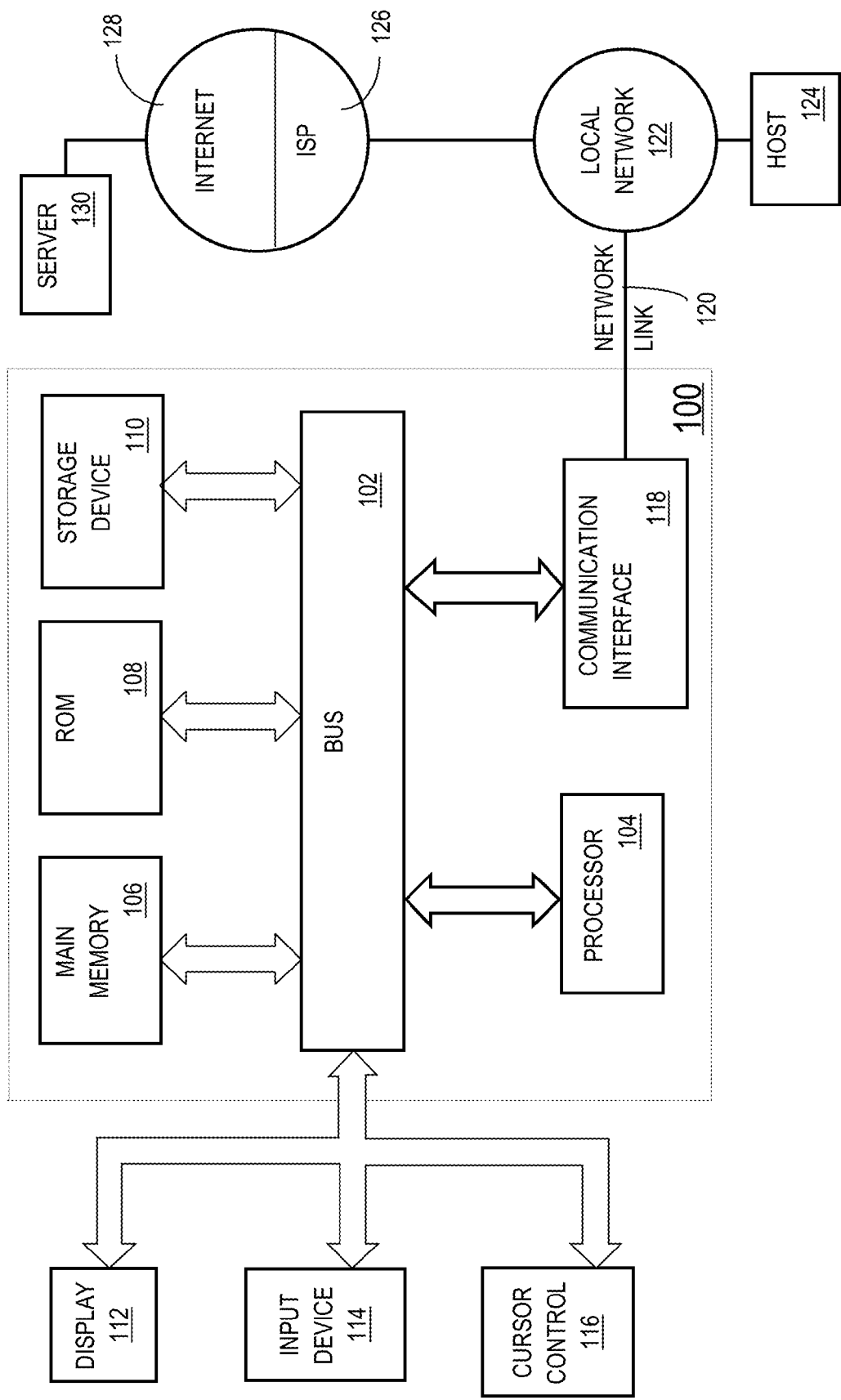
FIG. 1 shows a block diagram example of a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Table of Contents:
1. General Overview
2. Computer System
3. Deriving a Data Set
4. Maintaining a Database of Derived Data Sets
5. Examples
6. Extensions, Alternatives, and Miscellaneous

1. General Overview

One or more embodiments are directed to deriving a first data set from a second data set and maintaining the first data set in a database including derived data sets. The second data set, from which the first data set is derived, may be referred to herein as a primary data set. Updates to the primary data set are not immediately propagated to the derived data set due to time and resource expenses associated with updating the derived data set. Instead, the derived data set is updated during batch processing of a database comprising derived data sets. Updating the derived data sets during batch processing of the database instead of immediately in response to updates of the corresponding primary data set results in (a) temporary inconsistency between the derived data set and the corresponding primary data set and (b) performance gains with regard to the time and resources used to update the derived data set.

During the batch processing of the database comprising the derived data sets, a determination is made whether a particular derived data set is consistent with a corresponding primary data set from which it was derived. If the particular derived data set is inconsistent with the corresponding primary data set, the particular derived data set is deleted from the database. Alternatively, if the particular derived data set is inconsistent with the corresponding primary data set, the particular derived data set is updated to be consistent with the corresponding primary data set. Processing each batch in the database may result in deleting or updating a multitude of derived data sets resulting in advantageous performance over individually deleting or updating each derived data set when a corresponding primary data set is updated.

Batch processing of the database includes traversing the database in batches, e.g., by traversing multiple data sets within the database with each batch. In one example, the entire database may be processed as one batch or partitioned into multiple batches for processing at different times.

2. Computer System

In one or more embodiments, a computer system is used for deriving a data set and maintaining a derived data set. A computer system, as referred to herein, includes any device which includes a hardware processor. The computer system may refer to a client machine (e.g., a laptop, a hand-held device, a desktop, a tablet, etc.), a server (e.g., a web server, an authentication server, etc.), a peer-to-peer machine or any other type of machine comprising a hardware processor.

FIG. 1 is a block diagram that illustrates one example of a computer system 100 upon which an embodiment may be implemented. Components and/or functionalities described herein may not necessarily be implemented in each computer system and additional components and/or functionalities not described herein may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

One or more embodiments are related to the use of computer system 100 for maintaining a derived data set. According to one embodiment, updates (including addition, modification, and deletions) to a derived data set are determined by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for maintaining a derived data set as described herein.

The received code may be executed by processor 104 as it is received, and/or stored in storage device 110, or other non-volatile storage for later execution. In this manner, computer system 100 may obtain application code in the form of a carrier wave.

3. Deriving a Data Set

Figure 2:
FIG. 2 illustrates an example method for maintaining a database of derived data sets in accordance with one or more embodiments.

FIG. 2 illustrates a method in accordance with one or more embodiments. The specific operations described in FIG. 2 may be rearranged, modified, or removed. Thus, the specific sequence and list of operations should not be construed as limiting the scope of any of the embodiments.

In one or more embodiments, an operating system or an application executing on a computer system may derive a data set (referred to herein as a "derived data set") from one or more other data sets (referred to herein as a "primary data set") (Operation 202, FIG. 2).

In one example, a web server executing on a server machine may establish a communication session with a client-side application (also referred to herein as a "user") executing on a client machine. In this example, a primary data set includes a user object and an access level object. A user object defines characteristics of the user. For example, a user object may indicate a user identification, a device type, an access level associated with the user, an access level type associated with the user, a software port used for communication with the user, or a pointer to a corresponding access level object. The access level type in the user object may itself be a pointer to an access level object. For instance, a "guest" type may be a pointer a "guest" access level object. Similarly, user objects may include an "employee" type or an "administrator" type which respectively point to "employee" access level object and "administrator" access level object. An access level object may define the rules, configurations, access permissions, accessible resources, or accessible functions associated for users associated with the "guest" type. In an example, a "guest" access level object may prohibit associated users from reserving a conference room in a corporate building while an "employee" access level object may allow associated users to reserve conference rooms in the corporate building.

When the web server creates a communication session with a user, the information for the session (referred to herein as "session information") is derived from the user object, the corresponding access level object, and/or any other suitable information. For example, the session information may include an identification of the user, a device type used by the user, a time when the session was established, a time period since the session was established, a time when a last communication with the user was received or sent, a time period since the last communication with the user was received or sent, an identification of the type of data sent or received from the user that should be saved within the session information itself, etc.

In this example, the session information (derived data set) is stored within a session table (or other database) which includes session information for many different sessions. A session table may include thousands or millions of entries, each entry corresponding to one or more sessions. In an example, a session table is maintained by a controller device which is used for configuring access points that provide client devices access to resources.

In another example, a data set may be derived from a primary data set by simply copying a portion or all of the primary data set. A derived data set may include a data cache with a copy of recently and/or frequently accessed data.

Derivation of a first data set from a second data set, as referred to herein may include and is not limited to using a portion or all of the second data for the derivation and using information in addition to the second data set. Deriving the first data set may include copying, performing arithmetic, and/or performing logical computations based on the second data set.

In an embodiment, the primary data set is assigned at least one version number. In an example, each portion of the primary data set (e.g., user object and access level object) may be associated with respective version numbers. A version number for the primary data set may be determined based on the version numbers associated with the portions of the primary data set. The determination may include adding, multiplying, or otherwise using the version numbers associated with the portions of the primary data set to determine the version number for the primary data set. A derived data set is stored with a version number equivalent to a current version of the corresponding primary data set when the derived data set is derived.

In an embodiment, different primary data sets may include overlapping portions. In an example, a first primary data set includes user object A for user A and a "guest" level access object. A second primary data set includes user object B for user B and the same "guest" level access object. User object A and user object B both include references to the same "guest" level access object.

In an embodiment, the primary data set is stored with a Boolean value indicating whether the primary data set has been updated since a corresponding derived data set was derived from the primary data set.

4. Maintaing a Database of Derived Data Sets

One or more embodiments are directed to maintaining a derived data set. Maintaining a derived data set may include updating the derived data set based on updates to a primary data set from which the derived data set was derived. Examples of updates include additions, modifications, and deletions.

In an embodiment, a primary data set is updated without modifying a corresponding data set derived from that primary data set (Operation 204, FIG. 2). Updating the primary data set without updating the corresponding derived data set results in the primary data set being inconsistent with the corresponding derived data set.

In one example, a user-side application executing on a visitor's laptop has an established communication session with a corporate server located within an office building. The user object, created for the user-side application by the corporate server, is associated with a "guest" access level object. The "guest" access level object does not allow access to a room reservation module for reserving rooms within the office building. Based at least in part on the user object and the associated "guest" access level object, an entry is generated in a session table maintained by the corporate server which includes session information. The session information includes configuration information, access information, and/or destination ports at the corporate server that limit access by the visitor's laptop. The limited access prevents the user-side application executing on the visitor's laptop from reserving rooms within the office building. While the communication session is established and being used for communication between the user-side application and the corporate server, the corporation changes policy and allows guest users to reserve a guest conference room near an entrance to the office building. In order to implement the policy, the "guest" access level object is updated such that user objects associated with the "guest" access level object are given permissions to reserve the guest conference room. However, the session information maintained in the session table is not updated. As a result, the session information (derived data set) is inconsistent with the user object and the "guest" access level object (primary data set). Specifically, even though the "guest" access level now allows for associated user objects the permissions for reserving the guest conference room, the session information derived prior to the update prevents the client-side application from reserving the guest conference room even though the client-side application has "guest" access level.

In another example, a user using the client-side application may log out of the system or turn off the laptop corresponding to the user object created by the corporate server. As a result of the user logging out of the system or turning off the laptop, the user object (part of primary data set) is updated to indicate that the communication session is terminated. However, the session information is not updated to indicate that the session has been terminated. This results in the user object (primary data set) being inconsistent with the derived session information (derived data set).

In an embodiment, a version number associated with the primary data set is updated when the primary data set is updated. In an example, the primary data set includes a "guest" level access object. When a "guest" level access object is updated, the version number associated with the "guest" level access object is also updated. The version number for all primary data sets which include that "guest" level access object change as a result of the change to the "guest" level access object. For example, the version number of a primary data set is updated because that version number is computed by adding a version number of a user object and the version number of the "guest" level access object. The version number for the primary data set may not necessarily be computed when a version number for a portion of the primary data set is updated (i.e., when a version number for "guest" level access object is updated). The version number for the primary data set may be computed during the batch processing of the database as described below.

In an embodiment, each primary data set is used to derive no more than one derived data set. A Boolean value is maintained for each primary data set indicating whether the primary data set has been updated since the corresponding derived data set was derived from that primary data set.

In an embodiment, a database comprising derived data sets refers to any collection of derived data sets. In an example, a database is a session table which includes session information for multiple communication sessions established for communication with client side applications executing on different client-side machines.

In an embodiment, one or more derived data sets stored in a database comprising derived data sets are updated during batch processing of the database, instead of immediately in response to updates to corresponding primary data sets from which the one or more derived data sets were derived (Operation 206, FIG. 2).

In an embodiment, a database comprising derived data sets is continually traversed via batch processing. For example, a process with a lower priority than other processes (referred to herein as a "background process") is continually executed to traverse the database in batches. In another example, the database is traversed when resource utilization is below a threshold value and paused when resource utilization is above the threshold value. In an embodiment, the entire database comprising derived data sets may be periodically traversed (e.g., every n seconds). Alternatively, a portion (for example, m number of derived data sets) may be traversed every n seconds.

In an embodiment, batch processing of a portion or all of the database may be performed in response to determining that a threshold number of primary data sets have been updated, where the threshold number is greater than one. In an example, the threshold number is one hundred (100). A counter is used to track of a number of primary data sets that have been updated. When one hundred primary data sets have been updated, a traversal of the database comprising the derived data set is initiated and the counter is reset to zero (0).

In an embodiment, batch processing of the database may include a sequential traversal of data sets stored in the database. In an example, a counter is used as an index value to access data sets stored in the database. The database is traversed by accessing, modifying, and/or deleting a data set stored at the current counter (index value) and incrementing the counter thereafter before repeating the process.

In an embodiment, the database of derived data sets is maintained during batch processing of the database (Operation 208, FIG. 2). Maintenance of the database may include modifying, updating, or deleting one or more derived data sets within the database.

In an embodiment, during batch processing of the database of derived data sets, each traversed data set is checked for consistency with the primary data set from which that data set was derived. In one example, checking particular derived data set for consistency may include identifying the corresponding primary data set from which the derived data set was derived. A pointer or reference stored in the derived data set may be accessed to identify the corresponding primary data set. In another example, a table mapping each derived data set with each corresponding primary data set may be maintained by a computer system.

In an embodiment, the consistency check may further include comparing a version number of the primary data set with a version number of the corresponding derived data set. In an example, the version number of the primary data set may be computed, during the batch processing of the database of derived data sets (or beforehand), by adding version numbers associated with portions of the primary data set. A version number of a user object (which is updated each time the user object is updated) is added with a version number of an access" level object (which is updated each time the "access" level object is updated) to determine a version number for the primary data set as a whole. The version number of the derived data set is generally the version number stored with the derived data set when the derived data set is derived from the primary data set.

The version number of the primary data set is then compared to the version number associated with the derived data set. If the version number of the primary data set is different than the version number of the derived data set, then a determination is made that the primary data set is inconsistent with the derived data set. A specific implementation is described herein as an example for determining whether a derived data set is consistent with a corresponding primary data set, however, any mechanism for performing this consistency check may be implemented in accordance with one or more embodiments.

In another example, a primary data set corresponds to no more than one derived data set. To determine whether the primary data set is consistent with the corresponding derived data set, a Boolean value is maintained in association with the primary data set and used for indicating whether the primary data set has been updated after the corresponding derived data set was derived.

In an embodiment, data stored in a derived data set is compared to the data in the primary data set to determine whether the derived data set is consistent with the primary data set. For example, a checksum or hash value computed for both data sets may be compared to determine equivalency of the data sets.

In an embodiment, inconsistent derived data sets are deleted. In an example, during a traversal of a session table, session information is found to be inconsistent with a corresponding primary data set based on determining that a version number associated with the session information does not match a version number associated with the primary data set. In response to this determination, the session information is deleted from the session table (includes marking the session information for garbage collection).

In an embodiment, inconsistent derived data sets are modified to match corresponding primary data sets. In an example, when a first derived data set is found to be inconsistent with the corresponding primary data set, a new second derived data set is derived from the primary data set. The first derived data set is overwritten and/or replaced with the second derived data set.

In an embodiment, maintaining the database of derived data sets during the batch processing of the database includes modifying age information for the derived data sets. In an example, a batch of multiple derived data sets within the database are modified to indicate an age or time period since creation and/or access during the traversal of the database. If the age or time period exceeds a particular threshold, then the derived data set is deleted or updated with new information.

In an embodiment, multiple operations including two or more of: performing the consistency check, deleting or updating inconsistent derived data sets, modifying age information, and deleting or updating stale derived data sets are performed during the same traversal of the database. In one example, every n seconds, x derived data sets in a database are traversed to perform two or more maintenance operations as described herein.

5. EXAMPLES

In one or more embodiments, session information for a particular session is derived from a particular data set and stored in a database including session information for multiple sessions. The particular data set is updated without modifying the session information, where the session information is inconsistent with the updated data set. The database is traversed to determine whether session information for the multiple sessions stored in the database is consistent with corresponding data sets from which that session information is derived. During traversal of the database, session information for the particular session is determined to be inconsistent with the particular data set. The session information is deleted in response to determining that the session information is inconsistent with the particular data set.

In an embodiment, determining that the session information for the particular session is inconsistent with the particular data set is based on determining that a version number associated with the session information does not correlate with a version number associated with the data set. The version number associated with the data set may be based on a set of version numbers associated with different respective portions of the data set.

In an embodiment, determining that the session information for the particular session is inconsistent with the particular data set is based on a stored value indicating that at least a portion of the data set was updated after the session information was derived from the data set.

In an embodiment, the database is periodically or continuously traversed to identify session information that is inconsistent with the data set from which that session information was derived.

In an embodiment, the data set from which the session information is derived includes user information and access permission information. The access permission information may include a list of permissions associated with the session user (also known as an Access Control List). The access control list may be stored separately from the user information and referred to via a pointer included with the user information.

6. Extensions, Alternatives, and Miscellaneous

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    deriving, by a device including a hardware processor, a first plurality of data sets from a second plurality of data sets, wherein the first plurality of data sets includes a first data set, wherein the second plurality of data sets includes a second data set, and wherein deriving includes performing one or more computations;
    storing the first data set in a database, wherein the database includes the first plurality of data sets;
    updating the second data set without modifying the first data set;
    batch processing the database to determine whether the first plurality of data sets is consistent with the second plurality of data sets, wherein batch processing includes modifying a value associated with a data set in the first plurality of data sets, and wherein the value is indicative of a time period corresponding to a last read operation or a last write operation;
    determining that the first data set is inconsistent with the updated second data set, wherein determining includes identifying that a version number associated with the first data set does not correlate with a version number associated with the updated second data set; and
    updating the first data set to be consistent with the updated second data set or deleting the first data set.

2. The method of claim 1, wherein the first data set includes session information associated with a particular session established for communication between two or more applications.

3. The method of claim 1, wherein determining includes identifying a stored value indicating at least a portion of the second data was updated after the first data set was derived from the second data set.

4. The method of claim 1, wherein batch processing includes executing a process on the device with a lower priority than another process executing on the device.

5. The method of claim 1, wherein batch processing is performed periodically or continuously.

6. The method of claim 1, wherein batch processing further includes deleting multiple data sets from the first plurality of data sets.

7. The method of claim 1, wherein the second data set includes user information and access permissions information, and wherein updating the second data set includes updating the user information or the access permissions information.

8. The method of claim 1, wherein the first data set includes a pointer to at least a portion of the second data set.

9. A non-transitory computer readable storage medium comprising instructions that, when executed by one or more hardware processors, causes the one or more hardware processors to perform operations comprising:
- deriving a first plurality of data sets from a second plurality of data sets, wherein the first plurality of data sets includes a first data set, wherein the second plurality of data sets includes a second data set, and wherein deriving includes performing one or more computations;
- storing the first data set in a database, wherein the database includes the first plurality of data sets;
- updating the second data set without modifying the first data set;
- batch processing the database to determine whether the first plurality of data sets is consistent with the second plurality of data sets, wherein batch processing includes modifying a value associated with a data set in the first plurality of data sets, and wherein the value is indicative of a time period corresponding to a last read operation or a last write operation;
- determining that the first data set is inconsistent with the updated second data set, wherein determining includes identifying that a version number associated with the first data set does not correlate with a version number associated with the updated second data set; and
- updating the first data set to be consistent with the updated second data set or deleting the first data set.

10. The non-transitory computer readable storage medium of claim 9, wherein the first data set includes session information associated with a particular session established for communication between two or more applications.

11. The non-transitory computer readable storage medium of claim 9, wherein determining includes identifying a stored value indicating at least a portion of the second data was updated after the first data set was derived from the second data set.

12. The non-transitory computer readable storage medium of claim 9, wherein batch processing includes executing a process by the one or more hardware processors with a lower priority than another process executing by the one or more hardware processors.

13. The non-transitory computer readable storage medium of claim 9, wherein batch processing is performed periodically or continuously.

14. The non-transitory computer readable storage medium of claim 9, wherein batch processing further includes deleting multiple data sets from the first plurality of data sets.

15. The non-transitory computer readable storage medium of claim 9, wherein the second data set includes user information and access permissions information, and wherein updating the second data set includes updating the user information or the access permissions information.

16. The non-transitory computer readable storage medium of claim 9, wherein the first data set includes a pointer to at least a portion of the second data set.

17. The system of claim 9, wherein the first data set includes session information associated with a particular session established for communication between two or more applications.

18. The system of claim 9, wherein determining includes identifying a stored value indicating at least a portion of the second data was updated after the first data set was derived from the second data set.

19. A system comprising:
- one or more hardware processors;
- a non-transitory computer readable storage medium communicatively coupled to the one or more hardware processors, wherein the non-transitory computer readable storage medium includes instructions that, when executed by the one or more hardware processors, cause the one or more hardware processors to perform operations including:
  - deriving a first plurality of data sets from a second plurality of data sets, wherein the first plurality of data sets includes a first data set, wherein the second plurality of data sets includes a second data set, and wherein deriving includes performing one or more computations;
  - storing the first data set in a database, wherein the database includes the first plurality of data sets;
  - updating the second data set without modifying the first data set;
  - batch processing the database to determine whether the first plurality of data sets is consistent with the second plurality of data sets, wherein batch processing includes modifying a value associated with a data set in the first plurality of data sets, and wherein the value is indicative of a time period corresponding to a last read operation or a last write operation;
  - determining that the first data set is inconsistent with the updated second data set, wherein determining includes identifying that a version number associated with the first data set does not correlate with a version number associated with the updated second data set; and
  - updating the first data set to be consistent with the updated second data set or deleting the first data set.

20. The system of claim 19, wherein batch processing includes executing a process by the one or more hardware processors with a lower priority than another process executing by the one or more hardware processors.

21. The system of claim 19, wherein batch processing is performed periodically or continuously.

22. The system of claim 19, wherein batch processing further includes deleting multiple data sets from the first plurality of data sets.

23. The system of claim 19, wherein the second data set comprises user information and access permissions information, and wherein updating the second data set includes updating the user information or the access permissions information.

24. The system of claim 19, wherein the first data set includes a pointer to at least a portion of the second data set.

* * * * *